(12) United States Patent
Yoshikawa et al.

(10) Patent No.: US 9,079,613 B1
(45) Date of Patent: Jul. 14, 2015

(54) CRAWLER WORK VEHICLE

(71) Applicant: KOMATSU LTD., Tokyo (JP)

(72) Inventors: Takeshi Yoshikawa, Komatsu (JP); Taneaki Fujino, Komatsu (JP)

(73) Assignee: KOMATSU LTD., Tokyo (JP)

( * ) Notice: Subject to any disclaimer, the term of this patent is extended or adjusted under 35 U.S.C. 154(b) by 129 days.

(21) Appl. No.: 14/114,394

(22) PCT Filed: Oct. 1, 2012

(86) PCT No.: PCT/JP2012/075293
§ 371 (c)(1),
(2) Date: Oct. 28, 2013

(87) PCT Pub. No.: WO2013/164899
PCT Pub. Date: Nov. 7, 2013

(30) Foreign Application Priority Data

May 1, 2012 (JP) .................. 2012-104519

(51) Int. Cl.
| | | |
|---|---|---|
| *B60W 10/02* | (2006.01) | |
| *B60W 10/06* | (2006.01) | |
| *B60W 10/18* | (2012.01) | |
| *B62D 11/08* | (2006.01) | |
| *E02F 9/02* | (2006.01) | |

(Continued)

(52) U.S. Cl.
CPC ............. *B62D 11/08* (2013.01); *B60W 10/02* (2013.01); *B60W 10/06* (2013.01); *B60W 10/18* (2013.01); *E02F 9/02* (2013.01); *E02F 9/2062* (2013.01); *E02F 9/26* (2013.01)

(58) Field of Classification Search
CPC ..... B60W 10/02; B60W 10/06; B60W 10/10; B60W 10/18
See application file for complete search history.

(56) References Cited

U.S. PATENT DOCUMENTS

| | | | | |
|---|---|---|---|---|
| 4,484,280 A | * | 11/1984 | Brugger et al. | ................. 701/90 |
| 4,702,358 A | | 10/1987 | Mueller et al. | |
| 5,819,897 A | * | 10/1998 | Murata | ....................... 192/13 A |

(Continued)

FOREIGN PATENT DOCUMENTS

| | | |
|---|---|---|
| JP | 1-501054 A | 4/1989 |
| JP | 8-18573 B2 | 2/1996 |

(Continued)

OTHER PUBLICATIONS

International Search Report for PCT/JP2012/075293, issued on Nov. 6, 2012.

(Continued)

*Primary Examiner* — Edwin A Young
(74) *Attorney, Agent, or Firm* — Global IP Counselors, LLP

(57) ABSTRACT

A crawler work vehicle includes an engine, left and right travel devices, a power transmission device, left and right steering clutches, left and right steering brakes, a rotation speed detecting device, a brake hydraulic pressure obtaining device, and a brake protecting device. The rotation speed detecting device detects an output rotation speed of the steering brakes. The brake hydraulic pressure obtaining device obtains a brake hydraulic pressure supplied to the steering brakes. The brake protecting device refers to the output rotation speed and the brake hydraulic pressure to compute a heat rate of the steering brakes, and executes a protection process of the steering brakes by reducing the engine output upon determining the heat rate that was computed is equal to or greater than a preset first threshold.

8 Claims, 4 Drawing Sheets

(51) Int. Cl.
*E02F 9/20* (2006.01)
*E02F 9/26* (2006.01)

(56) References Cited

U.S. PATENT DOCUMENTS 6,283,263 B1    9/2001  Ibuki
2011/0272239 A1* 11/2011 Yoshikawa et al. ........ 192/113.3

FOREIGN PATENT DOCUMENTS

| JP | 2000-168609 A | 6/2000 |
| JP | 2003-63439 A | 3/2003 |
| JP | 2003-65431 A | 3/2003 |
| JP | 2010-144598 A | 7/2010 |
| JP | 2010-144816 A | 7/2010 |

OTHER PUBLICATIONS

The Chinese Office Action for the corresponding Chinese patent application No. 2014042901204330, issued on May 5, 2014.

* cited by examiner

CRAWLER WORK VEHICLE

CROSS-REFERENCE TO RELATED APPLICATIONS

This application is a U.S. National stage application of International Application No. PCT/JP2012/075293, filed on Oct. 1, 2012. This U.S. National stage application claims priority under 35 U.S.C. §119(a) to Japanese Patent Application No. 2012-104519, filed in Japan on May 1, 2012, the entire contents of which are hereby incorporated herein by reference.

BACKGROUND

1. Field of the Invention

The present invention relates to a work vehicle and in particular to a crawler work vehicle that travels using a crawler and is steered using a steering clutch and a steering brake.

2. Background Information

Power from an engine in a bulldozer, which is an example of a crawler work vehicle, is transmitted through a transmission to left and right drive wheels so that the left and right crawlers are driven. This type of bulldozer is provided with steering clutches and steering brakes corresponding to the left and right drive wheels. Left and right turning is conducted by controlling the left and right steering clutches and steering brakes with hydraulic pressure (see for example Japanese Patent Publication H8-18573).

For example, when gently turning left, the left side steering brake is set to a half-engaged condition and the left side steering clutch is disengaged while the right side steering clutch is engaged and the right side steering brake is disengaged.

Under such a condition, slippage occurs in the left side steering brake since the left side steering brake is in a half-engaged condition. Therefore, if such a condition continues for a long time, there is a problem that a thermal load on the left side steering brake increases and the steering brake is scorched.

Accordingly, in a control device on the vehicle of the Japanese Laid-open Patent 2010-144598, the engine speed is decreased to protect the steering brake when the vehicle is detected to be descending a slope with a certain angle of inclination or greater in a state in which a high gear speed is selected and when the engine rotation speed exceeds a certain rotation speed during a turning operation.

In a control device in the vehicle of the Japanese Laid-open Patent 2010-144816, when the vehicle is detected to be descending a slope with a certain angle of inclination or greater during a turning operation with a lock-up clutch in an engaged state, the lock-up clutch is disengaged. As a result, since the power is transmitted through a torque converter, the load is absorbed by the torque converter and the load on the steering brake is reduced to protect the steering brake.

SUMMARY

As described above, in a conventional steering brake protection process, a preset fixed load condition such as a vehicle angle of inclination or gear speed and the like is observed and the protection process is conducted when the fixed condition is satisfied.

However, it is difficult to set all of the overload modes for steering brakes. Further, many man-hours are required to ensure that the protection process is executed for all the overload modes. Further, in Japanese Laid-open Patent 2010-144816, while the thermal load on the steering brake is reduced, fuel consumption deteriorates when the engagement of the lock-up clutch is released to protect the steering brakes.

An object of the present invention is to accurately detect a load acting on the steering brakes and effectively protect the steering brakes.

A crawler work vehicle according to a first aspect of the present invention includes an engine, left and right travel devices, a power transmission device, left and right steering clutches, left and right steering brakes, a rotation speed detecting means, a brake hydraulic pressure obtaining means, and a brake protecting means. The left and right travel devices each have a crawler and drive wheels for driving the crawler. The power transmission device transmits power from the engine to the drive wheels of the left and right travel devices. The left and right steering clutches are disposed between the power transmission device and the left and right drive wheels and transmit or block power. The left and right steering brakes are respectively disposed between the left and right steering clutches and the left and right drive wheels and brake rotation of the left and right drive wheels. The rotation speed detecting means detects an output rotation speed of the steering brakes. The brake hydraulic pressure obtaining means obtains a brake hydraulic pressure supplied to the steering brakes. The brake protecting means refers to the output rotation speed and the brake hydraulic pressure to compute a heat rate of the steering brakes, and executes a protection process of the steering brakes by reducing the engine output when the computed heat rate is equal to or greater than a preset first threshold.

The power from the engine is transmitted through the power transmission device and the left and right steering clutches to the left and right travel devices. When turning, one of the steering clutches is engaged and one of the steering brakes is disengaged while the other steering clutch is disengaged and the other steering brake is engaged or set in a half-engaged condition. As a result, the vehicle turns in one direction.

Since the steering brake is in a half-engaged condition, slippage occurs in that steering brake especially when conducting a gentle turn with the above conditions. If such an operation continues for a long time, the steering brake may be damaged due to the thermal load.

Accordingly, the output rotation speed and the brake hydraulic pressure of the steering brakes are referenced to compute a heat rate of the steering brakes, and the computing result is compared to a preset first threshold. If the heat rate meets or exceeds the first threshold, it is determined that an overload is acting upon the steering brakes and the engine output is reduced.

Thus the output rotation speed of the steering brake is detected, the heat rate of the steering brake is computed, and protection process is executed on the basis of the computing result. Therefore, since instance of the overload acting upon the steering brakes can be detected reliably and with high accuracy under such conditions, the steering brakes can be effectively protected.

The crawler work vehicle according to a second aspect of the present invention relates to the work vehicle of the first aspect, wherein the brake protecting means conducts a heat rate computation and a protecting process repeatedly in a fixed cycle, and increases the engine output when the heat rate is equal to or less than a second threshold that is smaller than the first threshold.

If the heat rate of the steering brake drops, there is no need to reduce the engine output and thus the engine output is preferably increased in consideration of turning performance.

Accordingly, the engine output is increased by a certain amount when the heat rate meets or falls below the second threshold due to the execution of the protecting process in the vehicle of the second aspect. As a result, the reduction of the engine output is minimized as required to protect the steering brakes and a deterioration of the turning performance can be suppressed when the protecting process is executed.

Further, chattering during the control process can be prevented since the second threshold is a value smaller than the first threshold.

A crawler work vehicle according to a third aspect of the present invention is related to the work vehicle of the second aspect and further includes an engine rotation speed determining means that determines whether the engine speed is a previously accepted minimum engine speed. Further, when the heat rate meets or exceeds the first threshold, the brake protecting means executes a warning process to not reduce the engine output when the engine speed is lower than the minimum speed.

Reducing the output by lowering the engine speed and the like when the heat rate of the steering brakes meets or exceeds the first threshold is an effective process for protecting the steering brakes. However, if the engine speed is reduced too much, satisfactory vehicle performance cannot be achieved. Accordingly, if the engine speed falls below the minimum speed acceptable for vehicle performance, a process to emit a warning to the operator is executed instead of reducing the engine output.

A crawler work vehicle according to a fourth aspect of the present invention is related to the work vehicle from any of the first to third aspects, wherein the power transmission device includes a torque converter that transmits power through operating fluid.

When an overload acts on the steering brakes, the protection of the steering brakes is simplified since a certain load can be absorbed by the torque converter.

According to the present invention described above, a load acting on the steering brake can be accurately detected and the steering brakes can be effectively protected. Further, reduction in turning performance can be suppressed and the steering brakes can be protected by conducting control so that the heat rate of a steering brake is held between two thresholds.

DETAILED DESCRIPTION OF EMBODIMENTS

Figure 1:
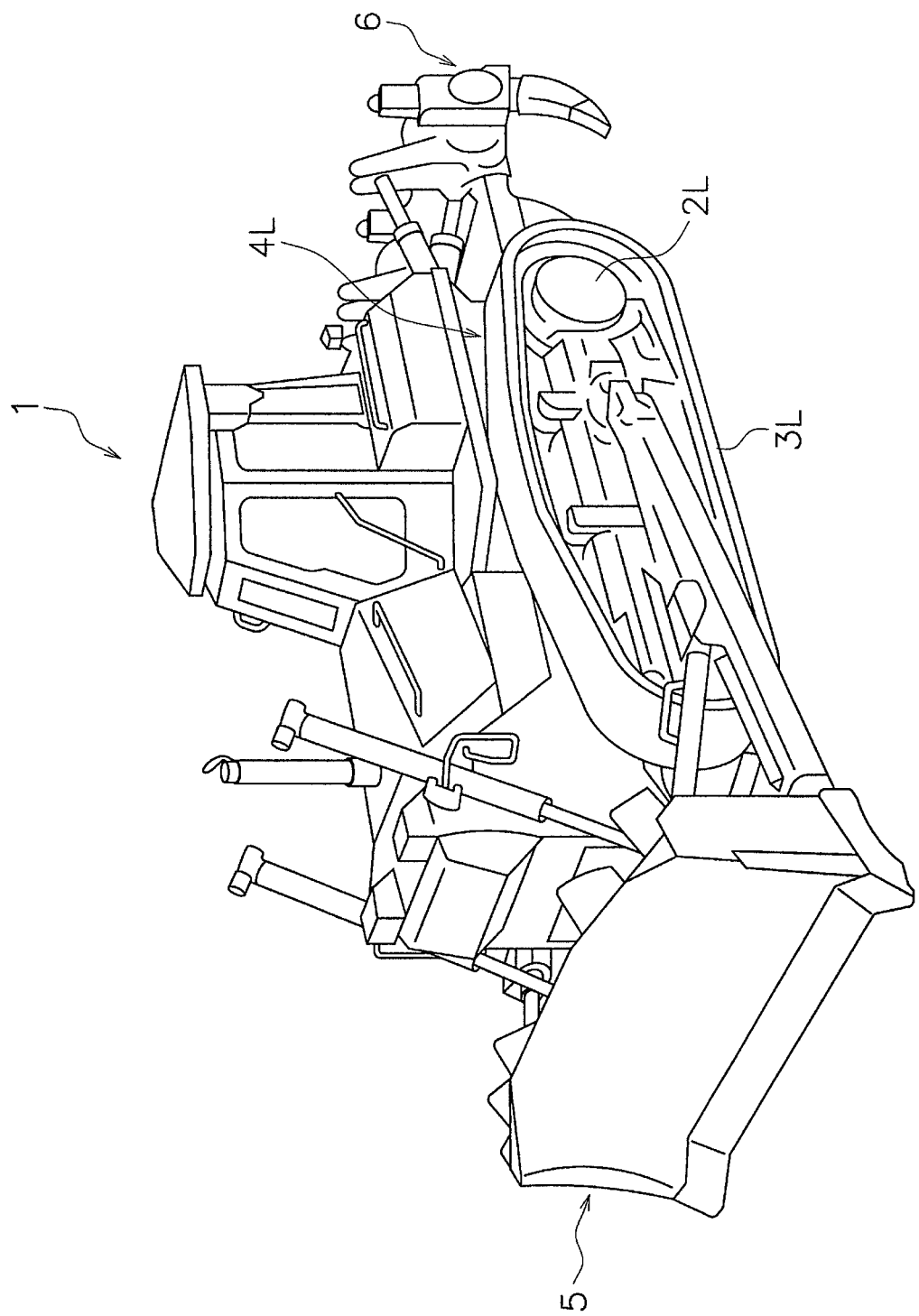
FIG. 1 is an external perspective view of a bulldozer according to an embodiment of the present invention.
Figure 2:
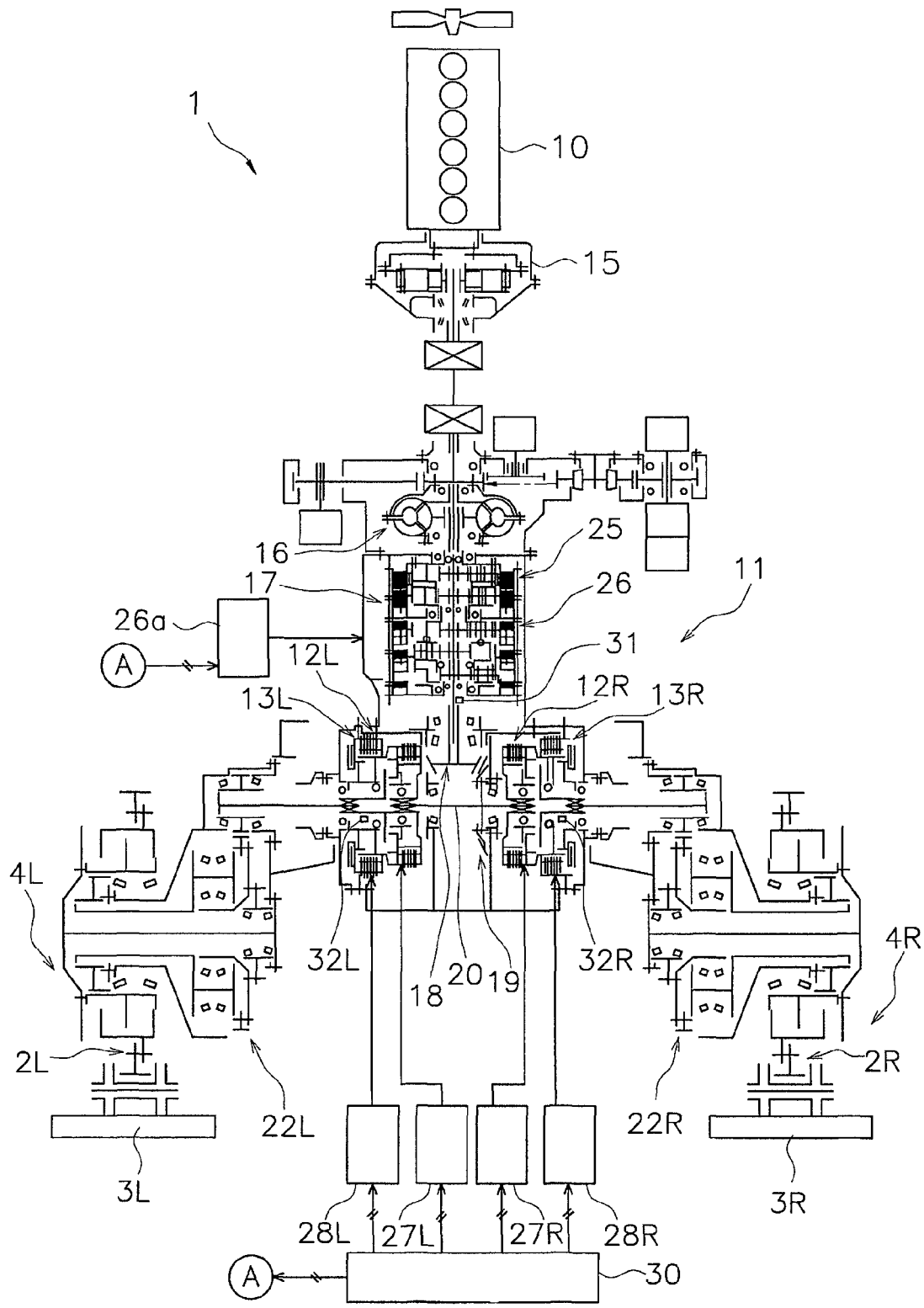
FIG. 2 illustrates a schematic configuration of the bulldozer illustrated in FIG. 1.

A bulldozer 1 illustrated in FIG. 1 is an example of a crawler work vehicle. The bulldozer 1 is equipped with left and right travel devices 4L, 4R that respectively have sprockets 2L, 2R and crawlers 3L, 3R; a blade 5 provided at the front portion of the vehicle; and a ripper device 6 provided at the rear portion of the vehicle as illustrated in FIGS. 1 and 2. The bulldozer 1 is able to do work such as pushing earth with the blade 5, and work such as excavation and crushing and the like with the ripper device 6.

(Configuration of Power Transmission System)

As illustrated in FIG. 2, the bulldozer 1 includes an engine 10, a power transmission device 11 that transmits power from the engine 10 to the left and right sprockets 2L, 2R, left and right steering clutches 12L, 12R, and left and right steering brakes 13L, 13R.

Power from the engine 10 is transmitted through a damper 15 to a torque converter 16 in the power transmission device 11. An output shaft of the torque converter 16 is coupled to an input shaft of a transmission 17 so that power from the torque converter 16 is transmitted to the transmission 17. The power output from the transmission 17 is transmitted through a first bevel gear 18 and a second bevel gear 19 to a cross shaft 20.

The power transmitted to the cross shaft 20 is transmitted through the left steering clutch 12L and a left final drive gear 22L to the left sprocket 2L. Moreover, the power transmitted to the cross shaft 20 is transmitted through the right steering clutch 12R and a right final drive gear 22R to the right sprocket 2R. The crawlers 3L, 3R are wound around the sprockets 2L, 2R. As a result, when the sprockets are rotated, the crawlers 3L, 3R are driven and consequently the bulldozer 1 travels.

A forward-reverse shifting clutch 25 and a plurality of gear changing clutches 26 are provided in the transmission 17. The clutches 25, 26 are hydraulic clutches that are able to switch hydraulically between an engaged condition and a disengaged condition. The supply and discharge of pressure oil to the clutches 25, 26 are controlled by a transmission control valve 26a.

The left and right steering clutches 12L, 12R are respectively provided between the power transmission device 11 and the left and right sprockets 2L, 2R, and are hydraulic clutches that are able to hydraulically switch between an engaged condition and a disengaged condition. The supply and discharge of pressure oil to the steering clutches 12L, 12R are controlled by steering clutch control valves 27L, 27R. The left and right steering clutches 12L, 12R are negative type hydraulic clutches and thus are engaged when hydraulic pressure is not supplied and become disengaged when a certain amount or more hydraulic pressure is supplied.

In this case, power is transmitted from the second bevel gear 19 to the left sprocket 2L when the left steering clutch 12L is in the engaged condition. Further, power is transmitted from the second bevel gear 19 to the right sprocket 2R when the right steering clutch 12R is in the engaged condition.

The left and right steering brakes 13L, 13R are respectively disposed between the left and right steering clutches 12L, 12R and the left and right sprockets 2L, 2R. The supply and discharge of pressure oil to the steering brakes 13L, 13R are controlled by brake control valves 28L, 28R, and are hydraulic brakes that are able to hydraulically switch between an braking state and a non-braking state. The left and right steering brakes 13L, 13R are normally braking-type hydraulic brakes, and enter the engaged condition (normally braking) when hydraulic pressure is not supplied, and become disengaged when a certain amount or more of hydraulic pressure is supplied. Therefore, when the supplied brake hydraulic pressure is lower than the certain amount, an engagement region is entered in which complete engagement with "0" slippage and a half-engaged condition in which slippage occurs are both possible.

Braking of the output rotation of the left steering clutch 12L, that is, rotation of the left sprocket 2L, is possible in accordance with the braking state of the left steering brake 13L. Further, braking of the output rotation of the right steering clutch 12R, that is, rotation of the right sprocket 2R is possible in accordance with the braking state of the right steering brake 13R.

According to the above configuration, when the left steering clutch 12L is disengaged and the left steering brake 13L is braking or half-braking (half-engaged) while the right steering clutch 12R is engaged and the right sprocket 2R is rotating, the bulldozer 1 turns to the left. Conversely, when the right steering clutch 12R is disengaged and the right steering brake 13R is braking or half-braking (half-engaged) while the left steering clutch 12L is engaged and the left sprocket 2L is rotating, the bulldozer 1 turns to the right.

(Configuration for Output Control)

The bulldozer 1 has a control unit 30. The control unit 30 switches velocity stages of the transmission 17, controls the control valves 26a, 27L, 27R, 28L, 28R, and executes a protection process of the left and right steering brakes 13L, 13R.

To carry out protection of the left and right steering brakes 13L, 13R, the control unit 30 includes an on/off determining function, a rotation speed detecting function, a brake hydraulic pressure obtaining function, and a protection function.

The on/off determining function is a function that determines whether each of the steering brakes 13L, 13R is in an engagement region according to a hydraulic pressure command value for the steering brakes 13L, 13R. The rotation speed detecting function is a function that detects an output rotation speed of each of the steering brakes 13L, 13R in accordance with rotation speed detecting sensors 32L, 32R respectively provided on output portions of the steering clutches 12L, 12R. The brake hydraulic pressure obtaining function is a function that obtains the hydraulic pressure supplied to each of the steering brakes 13L, 13R according to the hydraulic pressure command value for the steering brakes 13L, 13R. The protection function is a function for referring to the output rotation speed and the brake hydraulic pressure, computing a heat rate of a steering brake generated by slippage, and comparing the computed heat rate with a preset threshold to execute the steering brake protection process.

The hydraulic pressure supplied to the steering brakes 13L, 13R may be actually detected by a hydraulic pressure sensor.

(Protection Process)

Figure 3:
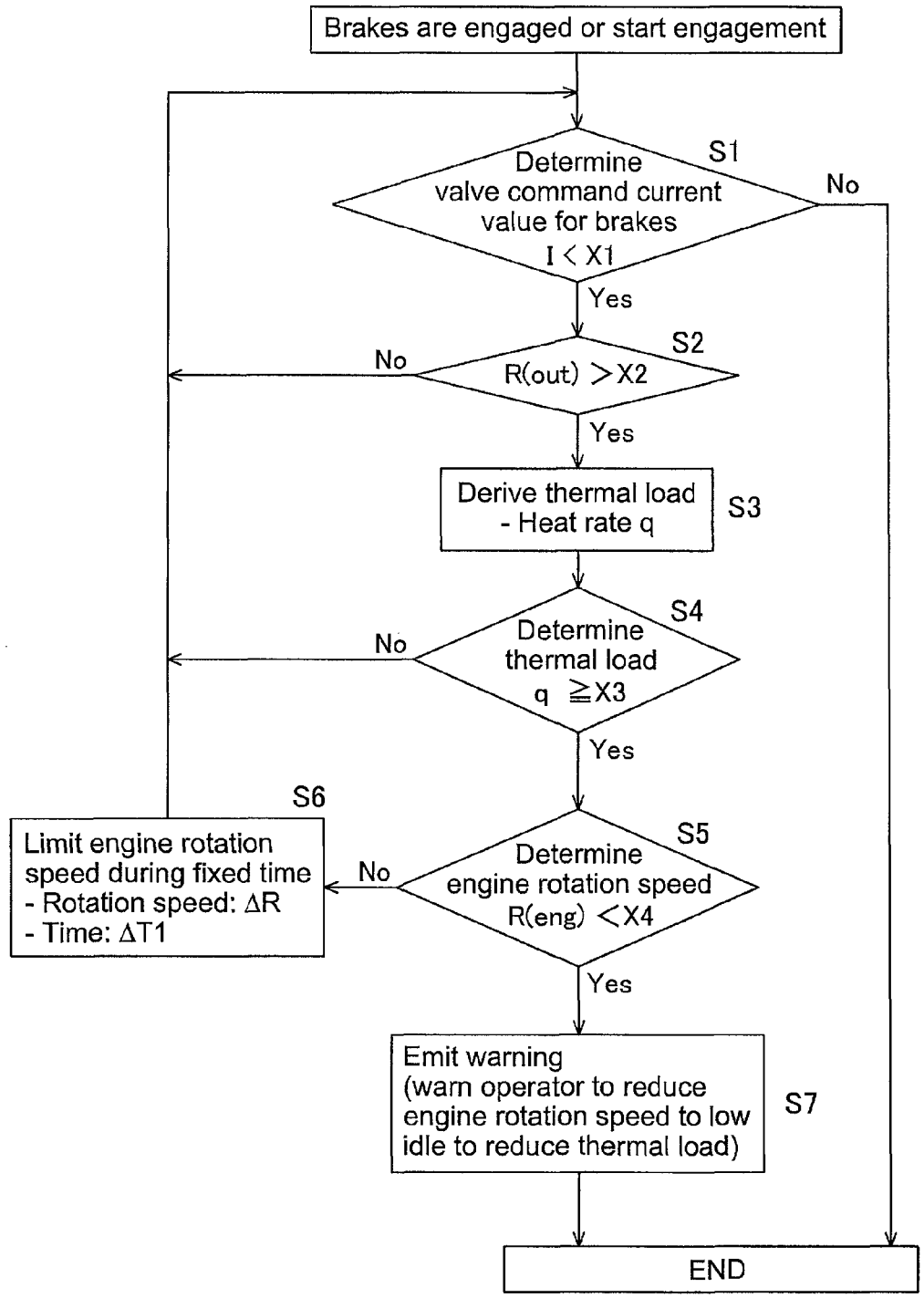
FIG. 3 is a flow chart of a protection process of steering brakes.

An explanation of the protection process of the steering brakes 13L, 13R will be provided according to a flowchart in FIG. 3. While the following describes the protection process of the left steering brake 13L, the protection process of the right steering brake 13R is exactly the same.

First, in step S1, a determination is made as to whether the left steering brake 13L (referred to simply as "steering brake" below) is in an engagement region according to a hydraulic pressure command value I (current value) for the steering brake. Specifically, a determination is made as to whether the command current value I is less than a threshold X1. As described above, the steering brake is a hydraulic brake that is maintained in a braking condition when brake hydraulic pressure is not supplied, and is disengaged when the hydraulic pressure becomes equal to or higher than a certain value. Therefore, if the command current value I is less than the threshold X1, the steering brake is determined to be in the engagement region and the routine advances to step S2. If the command current value I is not less than the threshold X1, the steering brake is determined to be in the disengaged state and the protection process is not executed.

In step S2, the output rotation speed of the steering brakes is detected. Specifically, a detection value R(out) from the rotation speed detecting sensor 32L at the output portion of the steering clutch is made the output rotation speed of the steering brake. A determination is then made as to whether the output rotation speed R(out) is larger than a threshold X2. The threshold X2 may normally be set as "0 rpm", or may be set as a low rotation speed close to 0 rpm.

If the output rotation speed R(out) is larger than the threshold X2, the routine moves from step S2 to step S3. In step S3, a heat rate q that is a thermal load on the steering brake is computed using the following equation (1).

$$q = \mu \times P \times R(\text{out}) \tag{1}$$

μ: friction coefficient of the friction members that constitute the steering brake
P: brake pressure force at a certain time (computed from the hydraulic pressure command value and the brake disk surface area).

In step S4, a determination is made as to whether the heat rate q is equal to or greater than a threshold X3. The threshold X3 is a threshold preset according to the plates that constitute the steering brake and the durability of the friction members fixed to the plates.

If the heat rate q is greater than the threshold X3, the routine moves from step S4 to step S5. In step S5, a determination is made as to whether a current engine rotation speed R(eng) is lower than a threshold X4. The threshold X4 is the minimum engine rotation speed allowed in the vehicle and is preset.

If the engine rotation speed is equal to or greater than the threshold X4, the routine moves from step S5 to step S6 since a margin exists to further reduce the engine rotation speed from the current rotation speed. In step S6, the engine rotation speed is reduced by a certain time (ΔT) and a certain rotation speed (ΔR) to reduce the engine output. The routine then returns to step S1 and the above processing is repeated. As a result, a thermal load on the steering brake is reduced.

Further, in step S5, if the engine rotation speed is equal to or less than the threshold X4, the routine moves from step S5 to step S7 since it is not desirable to reduce the engine rotation speed any further. A warning process is conducted in step S7. Specifically, a warning to the operator to lower the engine rotation speed to a low idle speed is displayed on an operating panel and the like to reduce the thermal load on the steering clutch.

(Characteristics)

The heat rate of the steering brake caused by slippage is computed and the protection process is executed on the basis of the computing result. As a result, the steering brakes can be protected reliably with higher accuracy in comparison to a case of executing the protection process by estimating various slippage modes as in conventional devices.

(2) Since the output of the engine is controlled in consideration of the thermal load on the actual steering brakes, defects such as unnecessarily reducing the engine output or not reducing the engine output when necessary can be prevented.

(3) When a determination is made as to whether the engine rotation speed is the previously accepted minimum rotation speed and the engine rotation speed is lower than the minimum rotation speed when reducing the engine rotation speed to control the output, a warning process is executed without reducing the engine output. As a result, the minimum level of vehicle performance can be maintained.

Other Embodiments

The present invention is not limited to the above embodiments and various changes and modifications may be made without departing from the spirit of the invention.

While a process to reduce the engine rotation speed when the thermal load on the steering clutch has become high in the aforementioned embodiment, raising the engine output when the thermal load is reduced may be conducted along with the process of the aforementioned embodiment. This case is illustrated in a flow chart in FIG. 4.

Figure 4:
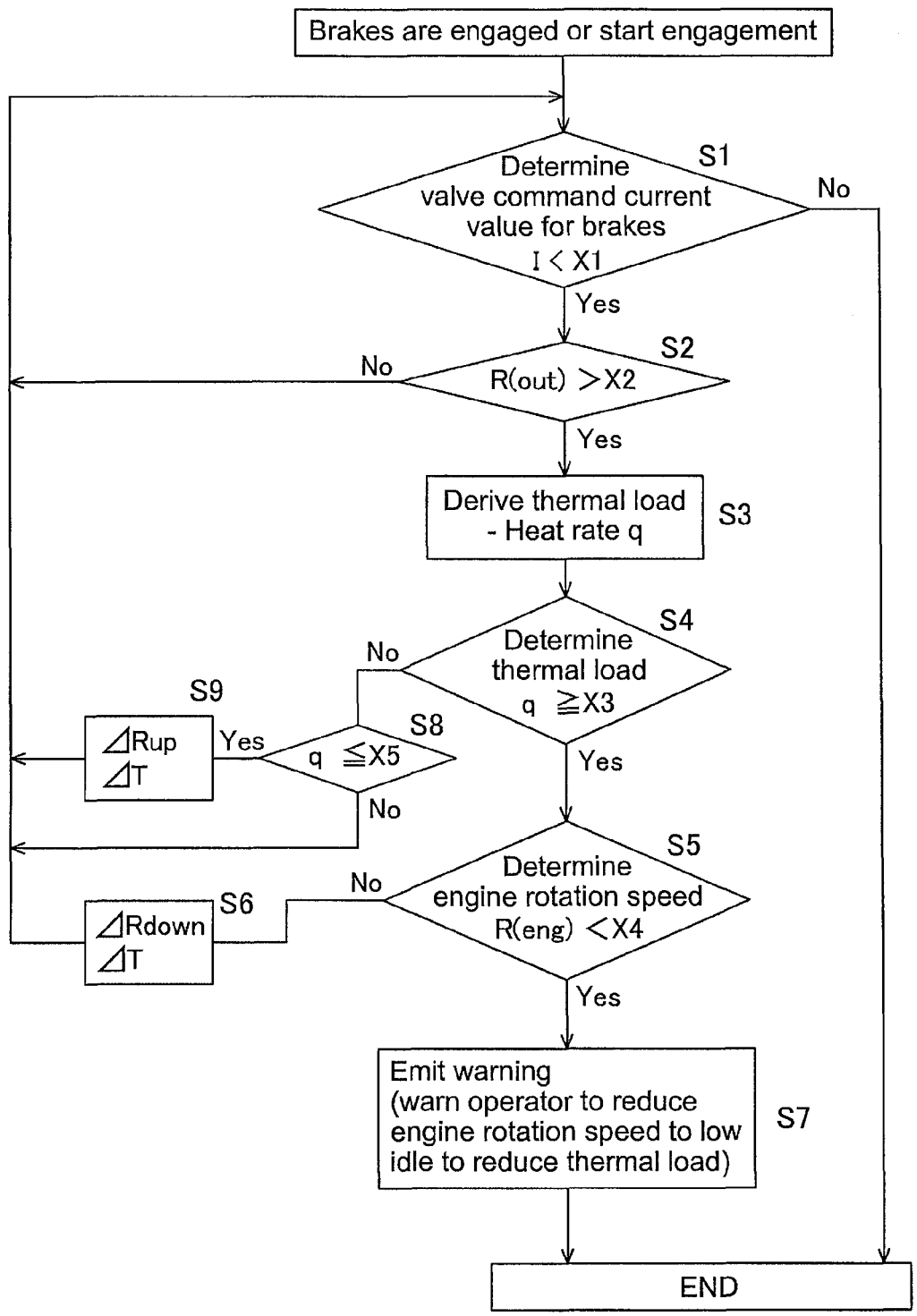
FIG. 4 is a flow chart of a protection process of steering brakes according to another embodiment.

The processing of steps S1 to S7 in FIG. 4 are the same as the processing of steps S1 to S7 in the aforementioned embodiment. Here, steps S8 and S9 are added.

Specifically, if the heat rate q of the steering clutch is lower than the threshold X3 in step S4, the routine moves to step S8. In step S8, a determination is made as to whether the heat rate q is equal to or less than a threshold X5. The threshold X5 is set as a value smaller than the threshold X3.

If the heat rate q is equal to or less than the threshold X5, the routine moves from step S8 to step S9 since it is determined that the thermal load is small enough. In step S9, the engine rotation speed is raised by a certain time ($\Delta T$) and a certain rotation speed ($\Delta R$) to increase the engine output. The routine then returns to step S1 and the above processing is repeated.

The engine output can be reduced within a required minimum limit for the protection of the steering brakes. As a result, deterioration of the turning performance due to the protection of the steering brakes can be suppressed.

(b) While the heat rate q of the steering brakes is computed to control the engine output in the aforementioned embodiment, a total heat value Q while slippage is occurring in the steering brakes may be derived so that the engine output is controlled according to whether the total heat value Q is equal to or greater than a certain threshold. In this case, "heat rate" may be replaced by "total heat value".

(c) While an example of a bulldozer has been described as the crawler work vehicle in the aforementioned embodiments, the present invention may be another crawler type work vehicle and can be applied in the same way to a vehicle including a steering clutch.

In the crawler work vehicle of the present invention, a load acting on the steering brakes can be accurately detected and the steering brakes can be effectively protected. Further, a reduction in turning performance can be suppressed and the steering brakes can be protected by controlling the heat rate of the steering brakes so that the heat rate is held between two thresholds.

The invention claimed is:

1. A crawler work vehicle comprising:
   an engine;
   left and right travel devices that respectively have a crawler and a drive wheel for driving the crawler;
   a power transmission device that transmits power from the engine to the drive wheels of the left and right travel devices;
   left and right steering clutches that are disposed between the power transmission device and the left and right drive wheels and transmit or block power;
   left and right steering brakes that are respectively disposed between the left and right steering clutches and the left and right drive wheels, and that brake rotation of the left and right drive wheels;
   a rotation speed detecting device that detects an output rotation speed of the steering brakes;
   a brake hydraulic pressure obtaining device that obtains a brake hydraulic pressure supplied to the steering brakes; and
   a brake protecting means that refers to the output rotation speed and the brake hydraulic pressure to compute a heat rate of the steering brakes, and that executes a protection process of the steering brakes by reducing the engine output upon determining the heat rate that was computed is equal to or greater than a preset first threshold.

2. The crawler work vehicle according to claim 1, wherein the brake protecting device conducts a heat rate computation and a protecting process repeatedly in a fixed cycle, and increases the engine output upon determining the heat rate is equal to or less than a second threshold that is smaller than the first threshold.

3. The crawler work vehicle according to claim 1, further comprising:
   an engine rotation speed determining device that determines whether the engine rotation speed is a previously accepted minimum engine rotation speed;
   the brake protecting device executing a warning process without reducing the engine output while the engine rotation speed is lower than the minimum rotation speed upon determining the heat rate is equal to or greater than the first threshold.

4. The crawler work vehicle according to claim 1, wherein the power transmission device includes a torque converter that transmits power through operating fluid.

5. The crawler work vehicle according to claim 2, further comprising:
   an engine rotation speed determining device that determines whether the engine rotation speed is a previously accepted minimum engine rotation speed;
   the brake protecting device executing a warning process without reducing the engine output while the engine rotation speed is lower than the minimum rotation speed upon determining the heat rate is equal to or greater than the first threshold.

6. The crawler work vehicle according to claim 5, wherein the power transmission device includes a torque converter that transmits power through operating fluid.

7. The crawler work vehicle according to claim 2, wherein the power transmission device includes a torque converter that transmits power through operating fluid.

8. The crawler work vehicle according to claim 3, wherein the power transmission device includes a torque converter that transmits power through operating fluid.

* * * * *